US011053353B2

(12) United States Patent
Buzinkai

(10) Patent No.: US 11,053,353 B2
(45) Date of Patent: Jul. 6, 2021

(54) RESINS FOR IMPROVED FLOW IN INJECTION MOLDING

(71) Applicant: INV Nylon Chemicals Americas, LLC, Wilmington, DE (US)

(72) Inventor: John F. Buzinkai, Chattanooga, TN (US)

(73) Assignee: INV Nylon Chemicals Americas, LLC, Wilmington, DE (US)

( * ) Notice: Subject to any disclaimer, the term of this patent is extended or adjusted under 35 U.S.C. 154(b) by 17 days.

(21) Appl. No.: 16/094,961

(22) PCT Filed: Apr. 13, 2017

(86) PCT No.: PCT/US2017/027369
§ 371 (c)(1),
(2) Date: Oct. 19, 2018

(87) PCT Pub. No.: WO2017/184422
PCT Pub. Date: Oct. 26, 2017

(65) Prior Publication Data
US 2019/0153155 A1    May 23, 2019

Related U.S. Application Data

(60) Provisional application No. 62/325,605, filed on Apr. 21, 2016.

(51) Int. Cl.
*C08G 69/26* (2006.01)
*B29C 45/00* (2006.01)
*B29K 77/00* (2006.01)

(52) U.S. Cl.
CPC .......... *C08G 69/26* (2013.01); *B29C 45/0001* (2013.01); *B29K 2077/00* (2013.01); *C08G 2120/00* (2013.01)

(58) Field of Classification Search
None
See application file for complete search history.

(56) References Cited

U.S. PATENT DOCUMENTS

| 4,859,390 A * | 8/1989 | Fritsch | B29B 9/06 |
| | | | 264/143 |
| 6,248,281 B1 * | 6/2001 | Abe | B29C 45/561 |
| | | | 264/328.7 |
| 2004/0235586 A1 * | 11/2004 | Chen | A63B 37/0003 |
| | | | 473/351 |
| 2006/0142443 A1 * | 6/2006 | Aramaki | C08K 3/32 |
| | | | 524/115 |
| 2011/0143074 A1 * | 6/2011 | Harsley | B29C 45/0081 |
| | | | 428/43 |
| 2013/0193614 A1 | 8/2013 | Perez Gesteira et al. | |
| 2014/0004335 A1 * | 1/2014 | Yusa | B29C 44/5681 |
| | | | 428/314.4 |
| 2017/0283556 A1 * | 10/2017 | Ebata | C08J 3/246 |
| 2017/0313879 A1 * | 11/2017 | Kobayashi | C08L 77/06 |

FOREIGN PATENT DOCUMENTS

| CN | 103724941 A | 4/2014 |
| CN | 103724942 A | 4/2014 |
| JP | H01104652 A * | 10/1987 |
| WO | 2015/183385 A1 | 12/2015 |
| WO | 2017/184422 A1 | 10/2017 |

OTHER PUBLICATIONS

Kohan, Melvin I., "Section 10,3,5: Impact Properties", Nylon Plastics Handbook, 1995, pp. 306-312.
BASF, "Polyarnide 6 With Improved Flow Properties", Ultramid B High Speed, Sep. 18, 2013, pp. 1-6.
3M, "Broad Solutions for Effective Fastening", Electrical Markets, 3M™ Cable Ties and Bases, 2014, pp. 1-6.
International Search Report and Written Opinion received for PCT Application No. PCTIUS2017/027369, dated Sep. 14, 2017, 21 pages.
First Office Action and Search Report for CN application No. 201780027409.4, dated Jul. 6, 2020, 20 pages. (11 pages of english translation and 9 pages of official copy).

* cited by examiner

*Primary Examiner* — Jeffrey M Wollschlager
*Assistant Examiner* — Armand Melendez

(57) ABSTRACT

Resins for improved flow in injection molding, molded articles made from the same, and methods of using the same. A molded article formed from a polymer feed includes nylon-6,6. The molded article also includes a thin elongated profile including a thickness of up to 1.5 mm and a flow length of at least 25 cm. An absolute value of $\Delta RV$ of the molded article as compared to the polymer feed is from 0 to 5, the RV determined according to ASTM D789.

19 Claims, No Drawings

RESINS FOR IMPROVED FLOW IN INJECTION MOLDING

CROSS-REFERENCE TO RELATED APPLICATION

This application claims the benefit of priority to U.S. Provisional Patent Application Ser. No. 62/325,605, filed Apr. 21, 2016, the disclosure of which is incorporated herein in its entirety by reference.

FIELD

The present disclosure relates to polymer resins and molded articles formed therefrom.

BACKGROUND

In polymer injection molding, especially for elongated articles having a small cross-section, such as cable ties, or having thin walls, the rheological properties of the polymer resin melt are important for speed and quality of mold fillings. Low melt viscosity and high filling flow rate are desirable for properly filling an elongated and small cross-sectioned mold cavity at moderate injection pressures (e.g., avoiding excessively high injection pressures).

Typical lubricated unreinforced nylon-6,6 resins supplied to the injection molding industry have solution viscosity values in the range of 40 to 50 relative viscosity (RV), determined according to the ASTM D789 method. Cable tie molders typically run extremely high melt temperatures in an injection molding process in order to reduce the melt viscosity to improve flow and enable filling of elongated small cross-sectioned cavities in the mold. Barrel temperatures of 325-345° C. are common in injection molding machines to process 40-50 RV polymer resins, especially for forming cable ties. As a result of the mal degradation occurring during this processing at very high melt temperatures, polymer chain scission can occur, and solution viscosity of the final cable ties has been observed to range from 27 to 36 RV (as measured by ASTM D789). Thus, polymer molecular weight can be severely degraded in such processes involving high temperatures, which can cause undesired variability in the molding process (e.g., the degree of RV loss may vary over time).

SUMMARY

The injection molding industry, especially operating with elongated small cross-sectioned or thin-walled mold cavities, would benefit from a polymer resin with lower molecular weight and lower RV than typical lubricated unreinforced nylon-6,6 resins. Various embodiments of the present invention provide polymer resins with low melt viscosity and good stability of melt viscosity during the molding process, with only small changes in molecular weight during the molding process as shown by solution viscosity.

The current problem of RV variability during the molding process can be solved by providing a polymer resin (for example, nylon-6,6) as in the present disclosure. Features of the disclosed polymer can include lower molecular weight and lower RV than standard commercial lubricated unreinforced nylon-6,6 resins, as well as highly unbalanced polymer chain ends and a high level of stabilized chain ends. Such nylon-6,6 resins may allow injection molding to form elongated parts having thin walls or small cross-sections, such as 14-inch length 50-lb (nominal strength) cable ties (i.e., 35.6 cm length, 220 N nominal strength) using moderate melt temperatures in the barrel of an injection molding machine (IMM). Various embodiments of the disclosed process contrast with methods using very high melt temperatures necessary for certain commercially-available lubricated unreinforced nylon-6,6 resins.

Various embodiments provide a polyamide resin including from 90 to 99.9 wt. % polyamide condensation product of diacid and diamine, from 3 to 200 ppmw phosphorus, present as an oxyphosphorus compound, and from 800 to 3000 ppmw acetic acid end groups on the polyamide. The polyamide resin has amine end groups (AEG) below 40 milliequivalents per kg (meq/kg) of the polyamide resin. Various embodiments provide a molded article formed from the polyamide resin. Various embodiments provide a method of forming a molded article from the polyamide resin.

Various embodiments provide a molded article formed from a polymer feed. The molded article includes nylon-6,6. The molded article includes a section having a thin elongated profile that includes a thickness of up to 1.5 mm, and a flow length of at least 25 cm. An absolute value of ΔRV of the molded article as compared to the polymer feed is from 0 to 5, the RV determined according to ASTM D789. Various embodiments provide a method of making the molded article. The method includes flowing the polymer feed to a mold. The method also includes recovering the molded article from the mold.

Various embodiments provide a method for making a molded article. The method includes flowing a polymer feed to a mold. The method includes regulating the mold temperature via heat exchange with water at inlet temperature of water to the mold below 100° C. The method includes recovering a molded article from the mold. An absolute value of ΔRV of the molded article as compared to the polymer feed is from 0 to 5, the RV determined according to ASTM D789. The molded article includes nylon-6,6. The molded article includes a section having a thin elongated profile including a thickness of up to 1.5 mm, and a flow length of at least 25 cm.

Various embodiments provide a method of making a molded article. The method includes molding a polymer feed including nylon-6,6 to form the molded article without raising the temperature of the nylon-6,6 above 315° C. The molded article includes the nylon-6,6. The molded article also includes a section having a thin elongated profile that includes a thickness of up to 1.5 mm, and a flow length of at least 25 cm.

The disclosed method can be used to make molded articles including sections having a thin elongated profile with a thickness of up to 1.5 mm and a flow length of at least 30 cm, for example, at least 35 cm flow length. In one specific example, the molded article is a cable tie, the RV of the polymer feed is at least 26, and the cable ties are 50-lb nominal strength with a strap length of 36 cm and a thickness of up to 1.4 mm. The resulting ties, after standard moisture conditioning, can have a tensile yield strength of at least 370 N and can pass the UL 62275 drop impact test at −30° C.

DETAILED DESCRIPTION

As used herein, all percent compositions are given as weight-percentages, unless otherwise stated.
Polyamide Resin.

Various embodiments provide a polyamide resin. The polyamide resin can include from 90 to 99.9 wt. % polyamide condensation product of diacid and diamine. The polyamide resin can include from 3 to 200 ppmw phosphorus, present as an oxyphosphorus compound. The polyamide resin can include from 800 to 3000 ppmw acetic acid end groups on the polyamide (e.g., as non-reactive chain ends). This ratio is the weight of acetic acid (100% basis) added at start of polymerization process compared to weight of final polymer (including any other additives). The polyamide resin can have amine end groups (AEG) below 40 milliequivalents per kg (meq/kg) of the polyamide resin. In various embodiments, the polyamide resin can have a RV from 26 to 42, the RV determined according to ASTM D789.

In order to injection mold elongated small cross-sectioned cable ties, such as typical 14-inch, 50-lb (nominal strength) cable ties, manufacturers use extremely high melt temperatures during the injection molding process to reduce melt viscosity of a typical lubricated nylon-6,6 resin. This results in a large amount of thermal degradation of the nylon-6,6 polymer. The present disclosure solves the problem by providing a polyamide resin including a polyamide having a lower molecular weight than typical lubricated nylon-6,6 resins. In some embodiments, the polyamide includes unbalanced polymer chain ends and a high level of stabilized chain ends.

For commercial injection molding processes to fabricate such thin-wall parts, which most commonly use water below 100° C. as the heat-exchange fluid to maintain a consistent mold temperature, the rapid cooling of polymer within the mold cavities limits the polymer flow, since melt viscosity greatly increases as temperature decreases. In order to fill long cavities having thin-walls or small cross-sections, a combination of low initial melt viscosity (due to high melt temperature and/or reduced polymer molecular weight), rapid injection flow rate, and/or high injection pressure during the filling phase of mold cycle must be employed. For a given injection molding machine (IMM) and mold combination, processes often are already set near the practical upper limits for injection flow rate and injection pressure. For such processes, a resin which has lower initial molecular weight polymer, according to the present disclosure, is practically desirable versus processing standard molecular weight resins at extremely high temperatures.

In various embodiments, the polyamide resin can be sufficient such that the tensile strength (following ISO 527, dry-as-molded) of a molded 4.0 mm nominal thickness ISO test specimen is at least 80 MPa, and unnotched Charpy impact energy (following ISO 179, dry-as-molded) of a molded 4.0 mm nominal thickness ISO test specimen is at least 100 kJ/m$^2$, for example at least 120 kJ/m$^2$ or at least 140 kJ/m$^2$.

In one embodiment, the polyamide of the polyamide resin can have low molecular weight, which can be inferred by determining the solution viscosity, such as an RV 26 to 42 as measured by ASTM D789, such as 30 to 38, 33 to 39, or 33 to 37 (e.g., less than, equal to, or greater than 33, 34, 35, 36, 37, or 38), or at least 28, 30, at least 32. In comparison, standard commercial lubricated unreinforced nylon-6,6 resins normally have solution viscosity in a range between 42 to 50 RV, determined using the same method.

In some embodiments, the polyamide resin can have high level of acetic acid end-caps at about 18 to 20 meq/kg polymer (equivalent to about 1081 to 1201 ppmw acetic acid added at start of polymerization), relative to final polymer mass.

In comparison, standard commercial resins typically have acetic acid end-caps in the range of 0 to about 10 meq/kg polymer (equivalent to about 0 to 601 ppmw acetic acid (added at start of polymerization), relative to final polymer mass).

In some embodiments, the polyamide has unbalanced ends, with amine end groups (AEG) at about 25 to 45 meq/kg polymer (e.g., less than, equal to, or greater than 30, 31, 32, 33, 34, 35, 36, 37, 38, 39, or 40 meg/kg) and carboxylic end groups (CEG) at about 75 meq/kg polymer. In comparison, standard commercial resins typically have AEG in the range of about 40 to 55 meq/kg polymer.

Polyamides can be manufactured by polymerization of dicarboxylic acids and diacid derivatives and diamines. In some cases, polyamides may be produced via polymerization of aminocarboxylic acids, aminonitriles, or lactams. The dicarboxylic acid component is suitably at least one dicarboxylic acid of the molecular formula (I): $HO_2C-R^1-CO_2H$; wherein $R^1$ represents a divalent aliphatic, cycloaliphatic or aromatic radical or a covalent bond. $R^1$ suitably includes from 2 to 20 carbon atoms, for example 2 to 12 carbon atoms, for example 2 to 10 carbon atoms. $R^1$ may be a linear or branched, for example linear, alkylene radical including 2 to 12 carbon atoms, or 2 to 10 carbon atoms, for example 2, 4, 6 or 8 carbon atoms, an unsubstituted phenylene radical, or an unsubstituted cyclohexylene radical. Optionally, $R^1$ may contain one or more ether groups. For example, $R^1$ is an alkylene radical, for example a linear alkylene radical, including 2 to 12 carbon atoms, or 2 to 10 carbon atoms, for example 2, 4, 6 or 8 carbon atoms.

Specific examples of suitable dicarboxylic acids include hexane-1,6-dioic acid (adipic acid), octane-1,8-dioic acid (suberic acid), decane-1,10-dioic acid (sebacic acid), dodecane-1,12-dioic acid, 1,2-cyclohexanedicarboxylic acid, 1,3-cyclohexanedicarboxylic acid, 1,4-cyclohexanedicarboxylic acid, 1,2-cyclohexanediacetic acid, 1,3-cyclohexanediacetic acid, benzene-1,2-dicarboxylic acid (phthalic acid), benzene-1,3-dicarboxylic acid (isophthalic acid), benzene-1,4-dicarboxylic acid (terephthalic acid), 4,4'-oxybis(benzoic acid), and 2,6-naphthalene dicarboxylic acid. A suitable dicarboxylic acid is hexane-1,6-dioic acid (adipic acid).

The diamine component is suitably at least one diamine of the formula (II): $H_2N-R^2-NH_2$; wherein $R^2$ represents a divalent aliphatic, cycloaliphatic or aromatic radical. $R^2$ suitably includes from 2 to 20 carbon atoms, for example 4 to 12 carbon atoms, for example 4 to 10 carbon atoms. $R^2$ may be a linear or branched, for example linear, alkylene radical including 4 to 12 carbon atoms, for example 4 to 10 carbon atoms, for example 4, 6 or 8 carbon atoms, an unsubstituted phenylene radical, or an unsubstituted cyclohexylene radical. Optionally, $R^2$ may contain one or more ether groups. For example, $R^2$ is an alkylene radical, for example a linear alkylene radical, including 4 to 12 carbon atoms, or 4 to 10 carbon atoms, for example 2, 4, 6 or 8 carbon atoms.

Specific examples of suitable diamines include tetramethylene diamine, pentamethylene diamine, hexamethylene diamine, octamethylene diamine, decamethylene diamine, dodecamethylene diamine, 2-methylpentamethylene diamine, 3-methylpentamethylene diamine, 2-methylhexamethylene diamine, 3-methylhexamethylene diamine, 2,5-dimethylhexamethylene diamine, 2,2,4-trimethylhexamethylene diamine, 2,4,4-trimethylhexamethylene diamine, 2,7-dimethyloctamethylene diamine, 2,2,7,7-tetramethyloctamethylene diamine, 1,2-cyclohexanediamine, 1,3-cyclohexanediamine, 1,4-cyclohexanediamine, 4,4'-diaminodicyclohexylmethane, benzene-1,2-diamine, benzene-1,3-diamine and benzene-1,4-diamine. A suitable diamine is hexamethylene diamine.

In some embodiments, the diacid is adipic acid and the diamine is hexamethylenediamine.

The polyamide resin can further include a catalyst. In one embodiment, the catalyst can be present in the polyamide resin in an amount ranging from 10 ppm to 1,000 ppm by weight. In another aspect, the catalyst can be present in an amount ranging from 10 ppm to 300 ppm by weight. The catalyst can include, without limitation, phosphoric acid, phosphorous acid, hypophosphorous acid, hypophosphoric acid, arylphosphonic acids, arylphosphinic acids, salts thereof, and mixtures thereof. In one embodiment, the catalyst can be sodium hypophosphite (SHP), manganese hypophosphite, sodium phenylphosphinate, sodium phenylphosphonate, potassium phenylphosphinate, potassium phenylphosphonate, hexamethylenediammonium bis-phenylphosphinate, potassium tolylphosphinate, or mixtures thereof. In one aspect, the catalyst can be sodium hypophosphite (SHP).

Suitable examples of the polymer resin may include, but are not limited to, AB and AABB type polyamide (nylon) resins such as PA6, PA7, PA8, PA9, PA10, PA11, PA12, PA46, PA66, PA610, PA612, PA1010, PA1212, etc. In the polymer industry, the term "polyamide" is interchangeably used with "nylon", both having the same meaning to a person skilled in polymer science. For example, polyamide 6 (PA6) is also referred to as nylon 6 (N6). Likewise, polyamide 66 (PA66) is also referred to as nylon 66 or nylon-6,6 (N66).

Examples of suitable polyamides include, but are not limited to, polyhexamethlyeneadipamide (PA66), polycaproamide (PA6), polyenanthamide (PA7), polylaurolactamide (PA12), polyundecaneamide (PA11), polyhexamethylenedodecamide (PA612), and any combination thereof. Examples of suitable polyamides include PA66 (polyhexamethyleneadipamide) and PA6 (polycaproamide).

The polyamides according to the present disclosure may contain additives and property enhancers, such as and not limited to, delusterants, antioxidants, UV stabilizers, lubricants, defoamers, anticorrosion agents, plasticizers, pigments, dyes, heat stabilizers, hydrolysis stabilizers, nucleating agents, flame retardants, blowing agents, and combinations thereof.

It should be understood that the concept of producing a polyamide from diamines and diacids also encompasses the concept of polyamides produced from other suitable monomers, such as, amino acids or lactams. Without limiting the scope, examples of amino acids can include: 6-aminohexanoic acid; 7-aminoheptanoic acid; 11-aminoundecanoic acid; 12-aminododecanoic acid. Without limiting the scope of the disclosure, examples of lactams can include: caprolactam, enantholactam; lauryllactam. Suitable feeds for the disclosed process can include mixtures of diamines, diacids, amino acids and lactams, and can include monofunctional monomers as well as multifunctional monomers.

In some embodiments, the polyamide resins may contain unbalanced ends, that is, the polyamides have much fewer amine end group (AEG) chain ends than carboxyl end group (CEG) chain ends. The polyamide resins can contain acetic acid end-caps as the stabilized ends at a level of approximately 18 to 20 meq/kg polymer. The unbalanced ends and high level of stabilized ends tend to disfavor further polymerization. Such polyamide resins are therefore observed to avoid large increases in molecular weight in subsequent processes, including injection molding.

In some embodiments, the polyamide resin is processed at typical moisture levels employed for nylon-6,6 injection molding, normally in the range of 0.05 to 0.20 wt % moisture.

In one embodiment, a lubricated nylon-6,6 resin is provided that has solution viscosity of 36 RV (by ASTM D789), an unbalanced low level of amine ends groups (AEG) of 35 meq/kg polymer, and acetic acid end-caps of 18 meq/kg polymer (equivalent to about 1080 ppmw of added acetic acid) as the stabilized ends.

Such low-RV polyamide resins can be consistently molded into thin-walled, small cross-sectioned articles, such as 14-inch, 50-lb strength cable ties, and having molding RV loss or $\Delta RV$ of up to 5 units. The mechanical strength of the molded article made from the low-RV polyamide resin feedstock is surprisingly close to, the same, or better than the mechanical strength of a corresponding molded article made from a higher-RV polyamide resin.

The polyamide resin can optionally further include at least one copolyamide (e.g., a polyamide that is a copolymer including repeating groups that include an amide group and also including different repeating groups including another group, such as amide or another moeity), then non-limiting examples of suitable monomers to form copolyamides may include caprolactam, aminocaproic acid, 2-methyl-1,5-diaminopentane, sebacic acid, dodecanedioic acid, isophthalic acid, and terephthalic acid.

Molded Article.

In various embodiments the present invention provides a molded article formed from a polymer feed. The molded article can be any suitable molded article formed from an embodiment of the polyamide resin described herein. In some embodiments, the molded article includes nylon-6,6. The molded article can also include a section including a thin elongated profile that includes a thickness of up to 1.5 mm and a flow length of at least 25 cm. An absolute value of $\Delta RV$ of the molded article as compared to the polymer feed can be from 0 to 5, with the RV determined according to ASTM D789. The polymer feed can be a feed to an injection molding machine (e.g., to a mold) that forms the molded article from the polymer feed.

The molded article can be any suitable molded article. The polyamide resins of the present disclosure may be injection molded for molded articles and parts that have small cross-sections, long flow paths, and/or thin-walled structures. Suitable non-limiting examples are cable ties, electrical connector housings, thin-wall hollow flow conduits, thin-wall design parts such as coils, solid or hollow monofilaments, capillaries and such. Small cross-sections are not limited to just circular shapes and may include other shapes such as square, rectangular, oblong, triangular, polygons, and the like. The molded article can be adjacent to and attached to a substrate, such as a metal (e.g., metal or metal alloy) or another material (e.g., another plastic or a plastic composite), such as produced via injection molding of the polymer feed onto a substrate; in such embodiments, for purposes of determining weight percent, mechanical properties, and other compositional aspects of the molded article described herein, only the molded article and not the non-substrate portions of such substrate-molded article composites are considered.

In addition to the section having the thin elongated profile, the molded article can include one or more other sections having any suitable profile with no restriction on thickness or flow length. The section of the molded article having the thin elongated profile can be any proportion of the molded article, such as about 0.001 vol % to 100 vol % of the molded article, or about 0.001 vol % or less, or less than, equal to, or greater than about 0.01 vol %, 0.1, 1, 2, 3, 4, 5, 10, 20, 30, 40, 50, 60, 70, 80, 90, 95, 96, 97, 98, 99, 99.9, 99.99 vol %, or about 100 vol %. The section of the molded article having the thin elongated profile can be planar (e.g., a wall). The section having the thin elongated profile can have a polyhedral cross-section (e.g., triangle, square, rectangle, and the like) or a round cross-section (e.g., circle, oval), wherein the cross-section is taken perpendicular to the longitudinal direction (e.g., the length) of the section.

The thickness of the section having the thin elongated profile can be considered to be the smallest dimension of the section. The flow length can be considered to be the longest dimension of the section, such as the longitudinal dimension of the section (e.g., perpendicular to the thickness). The height of the section having the thin elongated profile (e.g., the axis perpendicular to both the thickness and the length) can be any suitable height relative to the size of the thickness and the length; for example, the height can be about equal to the thickness (e.g., as in the case of a circular- or square-shaped cross-section taken perpendicular to the longitudinal direction) or the height can be larger than the thickness (e.g., as in the case of a rectangular- or wall-shaped cross-section taken perpendicular to the longitudinal direction). The section having the thin elongated profile can be substantially the only section of the molded article, or the section having the thin elongated profile can abut another section of the molded article along its length or at one or more ends thereof.

The molded articles can include at least 80% nylon-6,6. For example, the molded articles can include at least 90% nylon-6,6.

Suitable polymer feeds have RV of from 26 to 42, for example, from 30 to 38, or, for example, from 33 to 37.

In some embodiments, the absolute value of the ΔRV between the molded article and the polymer feed can be 5 or 4 or 3 or 2 or 1 or 0. In other embodiments, the RV loss or ΔRV can be −5 or −4 or −3 or −2 or −1 or 0. In some other embodiments, the RV loss or ΔRV can be +1 or +2 or +3 or +4 or +5. The term "absolute value", as used herein, is defined as the actual magnitude of a numerical value or measurement irrespective of its relation to the other values. For example, the absolute value of −3.4 (written as |−3.4|) is equal to 3.4. In another example, the absolute value of +1.5 (written as |+1.5|) is equal to 1.5.

Method of Making a Molded Article.

In various embodiments, the present invention provides a method of making a molded article. The method can be any suitable method of forming an embodiment of a molded article described herein. For example, the method can include flowing the polymer feed to a mold, such as any suitable polymer feed described herein (e.g., polyamide resin). The method can include recovering the molded article from the mold.

The method can include flowing a polymer feed to a mold. The method can include regulating the mold temperature via heat exchange with water at inlet temperature of water to the mold below 100° C. The method can also include recovering a molded article from the mold, wherein an absolute value of ΔRV of the molded article as compared to the polymer feed is from 0 to 5, the RV determined according to ASTM D789. The molded article can be any suitable molded article, such as any molded article described herein, such as including nylon-6,6 and including a section having a thin elongated profile including a thickness of up to 1.5 mm (e.g., up to 0.1, 0.2, 0.3, 0.4, 0.5, 0.6, 0.7, 0.8, 0.9, 1, 1.1, 1.2, 1.3, 1.4, or 1.5 mm), and a flow length of at least 25 cm (e.g., greater than or equal to 25 cm, 30, 35, 40, 45, 50, 55, 60, 65, 70, 75, or 80 cm or more).

The polymer feed can be in any suitable form, such as pellets or another solid form.

In some embodiments, the polymer feed includes at least 80% nylon-6,6. In other embodiments, the polymer feed includes at least 90% nylon-6,6.

In some embodiments of the method for making a molded article, the RV of the polymer feed is from 26 to 42. In other embodiments of the method for making a molded article, the RV of the polymer feed is from 30 to 38. In some other embodiments of the method for making a molded article, the RV of the polymer feed is from 33 to 37.

In some embodiments, the method includes molding of the polymer feed (e.g., of nylon-6,6), wherein the molding method is carried out without raising the temperature of the polymer feed above 315° C. (e.g., without raising above 300° C., 302, 304, 306, 308, 310, 311, 312, 313, 314, 315, 316, 317, 318, 319, 320, 325, 330, 335, or about 340° C.).

It may be desirable to control the moisture content of the polymer feed such that the polyamide component, as it is fed into molding process, contains from 0.03 to 0.20% water. In other embodiments, the moisture content is from 0.06 to 0.19%, from 0.08 to 0.18%, or from 0.10 to 0.17%; all percentages are by weight.

In various embodiments, the RV of the polymer feed can be at least 26, tensile strength (following ISO 527, dry-as-molded) of a molded 4.0 mm nominal thickness ISO test specimen can be at least 80 MPa (e.g., 80 to 100 MPa, or 80 to 90 MPa), and unnotched Charpy impact energy (following ISO 179, dry-as-molded) of a molded 4.0 mm nominal thickness ISO test specimen can be at least 100 kJ/m$^2$ (e.g., equal to or greater than 100 kJ/m$^2$, 110, 120, 130, 140, 150, 160, 170 kJ/m$^2$, and less than or equal to about 250 kJ/m$^2$, 240, 230, 220, or about 200 kJ/m$^2$). The polymer feed can have an RV of at least 28, for example at least 30, or for example at least 32.

Test Methods.

Molecular weight of polyamide resins is typically inferred by the measurement of solution viscosity. For example, higher solution viscosity means higher molecular weight and vice versa. The two most common methods are: (i) ASTM D789 for relative viscosity (RV) measurement, and (ii) ISO 307 using sulfuric acid to obtain viscosity number (VN) values.

The ISO 307 method provides equations for approximate inter-conversions between the RV and VN values. As an example, polyamide resins having a solution viscosity between 26 and 42 RV (by ASTM D789 method) would be equivalent to VN range of between 88 to 131 (by ISO 307 with sulfuric acid solvent) and RV value between 1.90 to 2.46 (by ISO 307 except with sample solution prepared as 1 w/v % solution in sulfuric acid). It is to be understood that viscosity values and trends to be considered are determined by the same method, regardless of which method is selected.

Solution viscosity can be determined according to the ASTM D789 method to provide RV values. Solution viscosity can be determined according to the ISO 307 method to provide VN values, with use of formic acid or sulfuric acid as solvent, as indicated.

The amine end group (AEG) value can be determined by a titration method. A polyamide sample is weighed and dissolved in a phenol/methanol solvent. Titration of the stirred sample solution is performed with perchloric acid in 1-propanol, with dosing and endpoint detection by an automated potentiometric titration instrument.

Tensile properties of cable ties can be determined by method in UL 62275 Section 5, with modification that cable tie head was placed at top of the upper half of split mandrel instead of at the split between the halves, so tensile strength of strap was tested, as opposed to the holding force of pawl.

Impact resistance of cable ties, in particular impact at low temperatures, can be determined by method in UL 62275 Section 9.

Tensile properties of molded test specimens or tensile bars with 4.0 mm nominal thickness can be determined by the ISO 527 method.

Impact properties of molded test specimens or tensile bars with 4.0 mm nominal thickness can be determined by the ISO 179 (Charpy) method.

EXAMPLES

The following Examples demonstrate the present disclosure and its capability for use. The disclosure is capable of other and different embodiments, and its several details are capable of modifications in various apparent respects, without departing from the spirit and scope of the present disclosure. Accordingly, the Examples are to be regarded as illustrative in nature and non-limiting.

Solution viscosity was determined according to the ASTM D789 method to provide RV values, where a polymer solution was prepared in 90 wt % formic acid as solvent, with concentration of 11.0 grams polyamide polymer per 100 mL of solvent, and RV (relative viscosity) was the ratio of polymer solution viscosity compared to solvent viscosity, based on measured drop times in calibrated viscometer tubes. The amine end group (AEG) value was determined by a titration method including weighing and dissolving a polyamide sample in a phenol/methanol solvent and titrating the stirred sample with perchloric acid in 1-propanol, with dosing and endpoint detection by an automated potentiometric titration instrument. Samples of unreinforced lubricated nylon-6,6 resins are made by a continuous polymerization process. The two resin samples are produced, having 36 RV (Example 1) and 35 RV (Example 2). In order to produce resins which tend to avoid further increases in molecular weight in subsequent processes, including injection molding, the formulations of these resins have unbalanced ends, that is, the polymers have much fewer amine end group (AEG) chain ends than carboxyl end group (CEO) chain ends. The resins also contain acetic acid end-caps as the stabilized ends at a level of approximately 18 to 20 meq/kg. This is about 1081 to 1201 ppmw acetic acid (added at start of polymerization), relative to final polymer mass. The amount is known by: preparation of acetic acid solution in water to concentration (verified by refractive index analysis); addition of desired amount of acetic acid solution to polymer ingredients is controlled by calibrated flow meter; flow rate of polymer ingredients controlled by calibrated flow meter, and confirmed by weight of product on certified scales.

The unbalanced ends and high level of stabilized ends disfavor further polymerization. If the resin is processed at typical moisture levels employed for nylon-6,6 injection molding, normally in the range of 0.05 to 0.20 wt % moisture, the polymer molecular weight tends not to increase more than a few RV units, if at all, during melt processing, which begins with feed of the resin pellets. In contrast, a 36 RV nylon-6,6 resin made with balanced or near-balanced ends, and without stabilized ends, tends to increase in molecular weight during melt processing, when moisture levels are at the typical range indicated above.

Example 1. Non-Nucleated Nylon-6,6 Resin at about 36 RV

A non-nucleated nylon-6,6 resin was produced with 35.9 RV and 37 AEG, as measured for the resin pellets. The nylon-6,6 resin was a polyamide containing: (i) at least 90 wt. % condensation product of adipic acid and hexamethylenediamine; (ii) from about 3 to about 200 ppmw phosphorus, present as an oxyphosphorus compound; (iii) from about 800 to about 3000 ppmw acetic acid end-caps (i.e., acetic acid incorporated into polyamide as non-reactive chain ends); and standard additives (lubricant, etc.) except nucleation additive.

The resin pellets have a melt point of about 264° C. and are molded into standard 4.0 mm thickness ISO tensile bars with 35.2 RV with a molding RV loss or ΔRV of about 0.7. The tensile strength was measured to be 84 MPa and tensile break strain was about 23%. The notched Charpy impact energy was measured to be about 4.4 kJ/m².

The resin pellets are molded in a spiral flow mold having 1.2 mm cavity thickness and 41" available cavity length using an Arburg 420C IMM (30 mm barrel, 110 tons maximum clamping force) at a melt temperature of 290° C. and 1,000 barg injection pressure. The resin melt consistently fills the spiral mold cavity to a linear distance of about 17". Similar tests with typical commercial polymer resin pellets having a 40-50 RV range give spiral mold cavity fill length of less than 15", with all process conditions being equal.

Example 2. Moderately Nucleated Nylon-6,6 Resin at about 35 RV

A moderately nucleated nylon-6,6 resin was produced with 35.5 RV and 37 AEG measured for the resin pellets. The nylon-6,6 resin of this Example was a polyamide containing: (i) at least 90 wt. % condensation product of adipic acid and hexamethylenediamine; (ii) from about 3 to about 200 ppmw phosphorus, present as an oxyphosphorus compound; (iii) from about 800 to about 3000 ppmw acetic acid end-caps; and standard additives (lubricant, nucleation additive, etc.). The resin pellets have a melt point of about 264° C. and are molded into a tensile bar with 35.0 RV with a molding RV loss or ΔRV of about 0.5. The tensile strength was measured to be 87 MPa and tensile break strain was about 20%. The notched Charpy impact energy was measured to be about 4.3 kJ/m².

These nylon-6,6 resin pellets are molded in a spiral flow mold having 1.2 mm cavity thickness using an Arburg 420C IMM (30 mm barrel, 110 tons maximum clamping force) at a melt temperature of 290° C. and 1,000 burg injection pressure. The resin melt consistently filled the spiral mold cavity up to a linear distance of about 17". Similar tests with typical commercial moderately nucleated polymer resin pellets having a 40-50 RV range give spiral mold cavity fill length of less than 15", with all process conditions being equal.

Comparative Example A. Standard Non-Nucleated Nylon-6,6 Resin at about 47 RV

A sample of a standard non-nucleated lubricated nylon-6,6 resin of type TORZEN® U4820L NC01 having 47 RV was molded for comparison of properties to give 4.0 mm thickness ISO tensile bars and to give 14"-length 50-lb (nominal strength) cable ties (as described in example 3). These molded specimens were used in the tests which show results in Table 1, Table 2, and Table 3 below.

Comparative Example B. Standard Moderately Nucleated Nylon-6,6 Resin at about 45 RV A sample of a standard moderately-nucleated lubricated nylon-6,6 resin of type TORZEN® U4664FL NC01 having 45 RV was molded for comparison of properties to give 4.0 mm thickness ISO tensile bars and to give 14"-length 50-lb (nominal strength) cable ties (as described in Example 3). These molded specimens were used in the tests which show results in Table 1, Table 2, and Table 3 below.

Comparative Example C. Cable Ties at about 23 RV

To generate test specimens having very low RV, a sample of 36 RV nylon-6,6 resin was combined with roughly 0.75 wt % metal stearate and roughly 2 wt % polyhydric alcohol, as these additives have been observed to cause scission of amide bonds in nylon-6,6. The mixture was fed to an Arburg 420C IMM with barrel temperatures of 320° C., where the elevated temperature accelerates scission of amide bonds to drive down polymer molecular weight. This procedure was used to provide cable ties having 22.9 RV and ISO tensile bars having 22.4 RV, as described in Example 3.

Comparative Example D. Cable Ties at about 20 RV

The same mixture was used as in Comparative Example C, except IMM barrel temperatures are 330° C. This procedure was used to provide cable ties having 20.1 RV, as described in Example 3.

Example 3. Molding of Cable Ties

A water-cooled lab cable tie mold, set up to run two 14" 50-lb (nominal strength) cable ties, was used in an Arburg 420C injection molding machine (110-ton IMM). Ties produced had cross-section dimensions of 1.3 mm thickness and 4.7 mm width. It required high melt temperatures for the standard 40-50 RV range nylon-6,6 resins to adequately fill 14" cavities as shown in Table 1.

The non-nucleated polyamide 66 resin pellets of Example 1 and having about 36 RV and 0.14% moisture were molded into 14" cable ties at about 310° C. and 1,700±50 barg injection peak pressure. The IMM barrel temperature was raised in 5° C. increments and 310° C. was found to be lowest temperature that gave complete fill of 14" tie cavities. Similar results were observed for the moderately nucleated polyamide 66 resin of Example 2. The ΔRV for the resins of Example 1 and Example 2 during the molding process was observed to be less than 5 units (see Table 1). These resins may provide much better consistency in a cable tie molding process.

Comparative Example A and Comparative Example B were molded into cable ties, using the same molding process settings as for Example 1 and Example 2, making any small adjustments needed to have the same 1,700±50 barg injection peak pressure. The IMM barrel temperature was raised in 5° C. increments to determine the minimum temperature which allowed complete fill of 14" tie cavities. As shown in Table 1, the mold barrel temperature was required to be 15-20° C. higher to make full length 14" ties with these standard resins, in comparison to Examples 1 and 2. This was observed when comparing samples with moderate moisture level (0.13 to 0.15%) and when comparing samples with low moisture level (0.06 to 0.09%), as shown by the two groups of examples in Table 1. The standard 40-50 RV resin pellet to cable tie RV loss or ΔRV during the molding process was observed to be 8 units or higher (Table 1).

The ΔRV for the standard 40-50 RV resins during molding was much greater than that of the resins of Examples 1 and 2. This decline in RV during molding is undesirable and leads to variability in the final RV, making the molding process inconsistent with respect to the finished product quality.

TABLE 1

RV loss (i.e., pellet RV minus cable tie RV) in cable tie molding process for moderate and low moisture levels. Each polyamide resin pellet sample was molded into 14-inch, 50-lb strength cable ties at about 1,700 ± 50 barg injection peak pressure with the barrel temperature appropriately maintained to the lowest temperature which allowed complete fill of 14" tie cavity.

| Example | Pellet RV | Pellet moisture level (wt %) | Molding melt temperature* | Cable Tie RV | RV Loss |
|---|---|---|---|---|---|
| Moderate Moisture Level | | | | | |
| Example 1 | 35.9 | 0.13% | 310° C. | 31.1 | 4.8 |
| Example 2 | 35.5 | 0.14% | 310° C. | 31.1 | 4.3 |
| Comparative Example A | 46.9 | 0.15% | 330° C. | 35.9 | 11.0 |
| Comparative Example B | 44.7 | 0.14% | 325° C. | 34.2 | 10.4 |
| Low Moisture Level | | | | | |
| Example 1 | 35.9 | 0.07% | 320° C. | 32.5 | 3.4 |
| Example 2 | 35.5 | 0.07% | 320° C. | 32.8 | 2.7 |
| Comparative Example A | 46.9 | 0.09% | 335° C. | 37.9 | 9.0 |
| Comparative Example B | 44.7 | 0.06% | 335° C. | 36.3 | 8.3 |

*Minimum temperature required for molding of full length 14-inch ties.

The low-RV polyamide resin pellets of Example 1 (35.9 RV) and Example 2 (35.5 RV) gave RV loss of less than 5 units during the injection molding process. For both Examples 1 and 2, the barrel temperature to achieve complete mold cavity fill was 310° C. for pellets having about 0.14 wt % moisture content and 320° C. for pellets having quite low moisture content about 0.07 wt %©.

In comparison, the RV loss for standard, commercial 40-50 RV polyamide resins (of Comparative Examples A and B) was higher than 8, and also, the barrel temperature required for complete mold cavity fill was 325-335° C. The higher molding temperature causes increased thermal degradation and the resulting increased RV loss, both of which are undesirable from the viewpoint of molding process consistency, speed, and finished product quality.

TABLE 2

Measured mechanical properties of 14" 50-lb nominal strength cable ties. Cable ties were conditioned in 23° C. 50% relative humidity (RH) air according to UL 62275 standard. The drop impact test, run according to UL 62275 method at 0.7 Joule impact energy, was run on cable ties chilled to −30° C. in a freezer.

| Example | Pellet RV | RV of cable ties | Tensile Yield Strength, Newtons (N) | Tensile Strain at Break | Drop impact test on ties at −30° C. (0.7 Joule impact) |
|---|---|---|---|---|---|
| Example 1 | 35.9 | 31.6 | 377 | 255% | Pass |
| Example 2 | 35.5 | 31.1 | 433 | 228% | Pass |
| Comparative Example A | 46.9 | 35.9 | 384 | 250% | Pass |
| Comparative Example B | 44.7 | 34.2 | 443 | 199% | Pass |
| Comparative Example C | 35.9 | 22.9 | 387 | 228% | Fail (cracked tie) |
| Comparative Example D | 35.9 | 20.1 | 389 | 219% | Fail (broken tie) |

It was observed that cable ties made from 35-36 RV resins of Examples 1 and 2 passed the UL 62275 Impact Test, as with the ties made from standard 45-47 RV resins from Comparative Examples A and B. Cable ties at 23 RV and 20 RV (Comparative Examples C and D), made with additives causing chain scission, failed the impact test, due to broken or cracked ties observed after impact. Cable ties having final RV in range 28 to 40 have good mechanical properties, but at lower RV the mechanical properties may suffer.

TABLE 3

Measured mechanical strength properties of molded ISO test specimens with 4.0 mm nominal thickness. All test specimens were molded at 290° C., except for Comparative Example C which was molded at 320° C. The acronym "DAM" indicates dry-as-molded.

| Example | Pellet RV | RV of tensile bar specimens | Unnotched Charpy Impact Energy, DAM, kJ/m$^2$ | Notched Charpy Impact Energy, DAM, kJ/m$^2$ | Tensile Strength, DAM, MPa | Tensile Break Strain, DAM |
|---|---|---|---|---|---|---|
| Example 1 | 35.9 | 35.2 | 194 | 4.4 | 84 | 23% |
| Example 2 | 35.5 | 35.0 | 180 | 4.3 | 87 | 20% |
| Comparative Example A | 46.9 | 45.2 | 179 | 4.3 | 84 | 21% |
| Comparative Example B | 44.7 | 42.9 | 175 | 4.3 | 85 | 31% |
| Comparative Example C | 35.9 | 22.4 | 59 | 2.6 | 81 | 4% |

Impact and tensile properties were equivalent for the tensile bar specimens of Examples 1 and 2 and those using the standard nylon-6,6 resins of Comparative Examples A and B. Very low RV tensile bar specimens of Comparative Example C exhibited poor impact and tensile properties.

According to "Section 10.3.5: Impact Properties" in "Nylon Plastics Handbook" edited by Kohan (1995), notched Izod Impact strength, by ASTM D256 method, shows an increasing trend with the specimen RV by ASTM D789 [FIG. 10.16 on Page No. 308]. The person skilled in the field knows that notched Charpy and notched Izod tests are usually close to each other in impact energy measured. Therefore, any trends observed for notched Izod can be expected to also be seen in notched Charpy. Surprisingly, Table 3 shows that the notched Charpy tests of tensile bar specimens of Examples 1 and 2 (RV 35-36) had equivalent results as compared to the 43-45 RV tensile bar specimens of Comparative Examples A and B in Table 3.

While the illustrative embodiments of the disclosure have been described with particularity, it will be understood that various other modifications will be apparent to and may be readily made by those skilled in the art without departing from the spirit and scope of the disclosure. Accordingly, it is not intended that the scope of the claims hereof be limited to the examples and descriptions set forth herein but rather that the claims be construed as encompassing all the features of patentable novelty which reside in the present disclosure, including all features which would be treated as equivalents thereof by those skilled in the art to which the disclosure pertains.

Exemplary Embodiments

The following exemplary embodiments are provided, the numbering of which is not to be construed as designating levels of importance:

Embodiment 1 provides a molded article formed from a polymer feed, the molded article comprising:
  nylon-6,6; and
  a section having a thin elongated profile comprising
    a thickness of up to 1.5 mm, and
    a flow length of at least 25 cm;
  wherein an absolute value of ΔRV of the molded article as compared to the polymer feed is from 0 to 5, the RV determined according to ASTM D789.

Embodiment 2 provides the molded article of Embodiment 1, wherein the polymer feed is a feed to an injection molding machine that forms the molded article from the polymer feed.

Embodiment 3 provides the molded article of any one of Embodiments 1-2, wherein the section having the thin elongated profile is 0.001 vol % to 100 vol % of the molded article.

Embodiment 4 provides the molded article of any one of Embodiments 1-3, wherein the section having the thin elongated profile is 100 vol % of the molded article.

Embodiment 5 provides the molded article of any one of Embodiments 1-4, wherein the nylon-6,6 is at least 80 wt. % of the molded article.

Embodiment 6 provides the molded article of any one of Embodiments 1-5, wherein the nylon-6,6 is at least 90 wt. % of the molded article.

Embodiment 7 provides the molded article of any one of Embodiments 1-6, wherein the RV of the polymer feed is ≤50, for example, from ≥26 to ≤42.

Embodiment 8 provides the molded article of any one of Embodiments 1-7, wherein the RV of the polymer feed is from ≥30 to ≤38.

Embodiment 9 provides the molded article of any one of Embodiments 1-8, wherein the RV of the polymer feed is from ≥33 to ≤37.

Embodiment 10 provides the molded article of any one of Embodiments 1-9, wherein the absolute value of the ΔRV is from ≥0 to ≤4.

Embodiment 11 provides the molded article of any one of Embodiments 1-10, wherein the absolute value of the ΔRV is from ≥0 to ≤3.

Embodiment 12 provides the molded article of any one of Embodiments 1-11, wherein the section having the thin elongated profile has a thickness of from 0.1 mm to 1.5 mm.

Embodiment 13 provides the molded article of any one of Embodiments 1-12, wherein the section with the elongated thin profile comprises a wall.

Embodiment 14 provides a method of making the molded article of any one of Embodiments 1-13, the method comprising:
flowing the polymer feed to a mold; and
recovering the molded article from the mold.

Embodiment 15 provides a method for making a molded article comprising:
flowing a polymer feed to a mold;
regulating the mold temperature via heat exchange with water at inlet temperature of water to the mold below 100° C.; and
recovering a molded article from the mold, wherein an absolute value of ΔRV of the molded article as compared to the polymer feed is from 0 to 5, the RV determined according to ASTM D789;
wherein the molded article comprises
nylon-6,6, and
a section having a thin elongated profile comprising
a thickness of up to 1.5 mm, and
a flow length of at least 25 cm.

Embodiment 16 provides the method of Embodiment 15, wherein the nylon-6,6 is at least 80 wt. % of the molded article.

Embodiment 17 provides the method of any one of Embodiments 15-16, wherein the nylon-6,6 is at least 90 wt. % of the molded article.

Embodiment 18 provides the method of any one of Embodiments 15-17, wherein the absolute value of the ΔRV is from ≥0 to ≤4.

Embodiment 19 provides the method of any one of Embodiments 15-18, wherein the absolute value of the ΔRV is from ≥0 to ≤3.

Embodiment 20 provides the method of any one of Embodiments 15-19, wherein the RV of the polymer feed is from ≥26 to ≤42.

Embodiment 21 provides the method of any one of Embodiments 15-20, wherein the RV of the polymer feed is from ≥30 to ≤38.

Embodiment 22 provides the method of any one of Embodiments 15-21, wherein the RV of the polymer feed is from ≥33 to ≤37.

Embodiment 23 provides a method of making a molded article comprising:
molding a polymer feed comprising nylon-6,6 to form the molded article without raising the temperature of the nylon-6,6 above 315° C.;
wherein the molded article comprises
the nylon-6,6, and
a section having a thin elongated profile comprising
a thickness of up to 1.5 mm, and
a flow length of at least 25 cm.

Embodiment 24 provides the method of Embodiment 23, wherein the flow length is from ≥30 cm to ≤90 cm.

Embodiment 25 provides the method of any one of Embodiments 23-24, wherein the flow length is from ≥35 cm to ≤80 cm.

Embodiment 26 provides a polyamide resin comprising:
from 90 to 99.9 wt. % polyamide condensation product of diacid and diamine;
from 3 to 200 ppmw phosphorus, present as an oxyphosphorus compound; and
from 800 to 3000 ppmw acetic acid end groups on the polyamide;
wherein the polyamide resin has amine end groups (AEG) ≤50 milliequivalents per kg, for example ≤45 milliequivalents per kg (meq/kg), for example, ≤45 milliequivalents per kg (meq/kg) of the polyamide resin.

Embodiment 27 provides the resin of Embodiment 26, wherein the polyamide resin has a RV from 26 to 42, the RV determined according to ASTM D789.

Embodiment 28 provides the resin of any one of Embodiments 26-27, further comprising at least one copolyamide.

Embodiment 29 provides the resin of any one of Embodiments 26-28, wherein the diacid is adipic acid and the diamine is hexamethylenediamine.

Embodiment 30 provides the resin of any one of Embodiments 26-29, wherein the moisture content in the polyamide resin is from 0.03 to 0.20 wt %.

Embodiment 31 provides the resin of any one of Embodiments 26-30, wherein a molded article formed from the polyamide resin has:
a tensile strength (ISO 527, dry-as-molded specimens) of at least 80 MPa, and
an unnotched Charpy impact energy (ISO 179, dry-as-molded specimens) of at least 100 kJ/m$^2$.

Embodiment 32 provides a molded article formed from the polyamide resin of any one of Embodiments 26-31.

Embodiment 33 provides a method of forming a molded article comprising:
flowing the polyamide resin of any one of Embodiments 26-31 to a mold; and
recovering the molded article from the mold.

Embodiment 34 provides the molded article, method, or polyamide resin of any one or any combination of Embodiments 1-33 optionally configured such that all elements or options recited are available to use or select from.

Embodiment 35 provides a polyamide resin comprising:
from 90 to 99.9 wt. % polyamide condensation product of diacid and diamine;
from 3 to 200 ppmw phosphorus, present as an oxyphosphorus compound; and
from 800 to 3000 ppmw acetic acid end groups on the polyamide;
wherein the polyamide resin has a RV from 26 to 42, the RV determined according to ASTM D789.

Embodiment 36 provides the resin of embodiment 35, wherein the polyamide resin has amine end groups (AEG) below 40 milliequivalents per kg (meq/kg) of the polyamide resin.

Embodiment 37 provides the resin of Embodiment 35 or 36, wherein the diacid is adipic acid and the diamine is hexamethylenediamine.

Embodiment 38 provides the resin of Embodiment 35 or 36, wherein the moisture content in the polyamide resin is from 0.03 to 0.20 wt %.

Embodiment 39 provides the resin of Embodiment 35 or 36, wherein a molded article formed from the polyamide resin has:

a tensile strength (ISO 527, dry-as-molded specimens) of at least 80 MPa, and an unnotched Charpy impact energy (ISO 179, dry-as-molded specimens) of at least 100 kJ/m2.

Embodiment 40 provides the resin of Embodiment 35 or 36, further comprising at least one copolyamide.

Embodiment 41 provides a molded article formed from the polyamide resin of Embodiment 35 or 36.

Embodiment 42 provides a method of forming a molded article comprising:

flowing the polyamide resin of Embodiments 35 or 36 to a mold; and recovering the molded article from the mold.

What is claimed is:

1. A method of making a molded article, the method comprising:

molding a polymer feed comprising nylon-6,6 in a mold to form the molded article without raising the temperature of the polymer feed above 320° C.; and recovering the molded article from the mold, the molded article comprising nylon-6,6, and a section having a thin elongated profile comprising a thickness of up to 1.5 mm, and a flow length of at least 25 cm;

wherein an absolute value of ΔRV of the molded article as compared to the polymer feed is from 0 to 4.8, the RV determined according to ASTM D789, the polymer feed comprises a polyamide resin having a moisture content of 0.03 to 0.20 wt %, the polyamide resin comprising from 90 to 99.9 wt. % polyamide condensation product of diacid and diamine, from 3 to 200 ppmw phosphorus, present as an oxyphosphorus compound, from 800 to 3000 ppmw acetic acid end groups on the polyamide, and amine end groups (AEG)<N milliequivalents per kg (meq/kg) of the polyamide resin, where N is selected from integers from 40 to 50, inclusive, the polyamide resin has a RV from 26 to 42, the RV determined according to ASTM D789, and the method is sufficient such that if the moisture content of the polymer feed is 0.14 wt %, then the absolute value of ΔRV of the molded article as compared to the polymer feed is from 0 to 4.8, the RV determined according to ASTM D789.

2. The method of claim 1, further comprising regulating the mold temperature via heat exchange with water at inlet temperature of water to the mold below 100° C.; and recovering the molded article from the mold, wherein an absolute value of ΔRV of the molded article as compared to the polymer feed is from 0 to 4.8, the RV determined according to ASTM D789.

3. The method of claim 1, wherein the nylon-6,6 is at least 80 wt. % of the molded article.

4. The method of claim 1, wherein the RV of the polymer feed is from ≥30 to ≤38, the RV determined according to ASTM D789.

5. The method of claim 1, wherein the section having the thin elongated profile is 0.001 vol % to 100 vol % of the molded article.

6. The method of claim 1, wherein the section having the thin elongated profile is 100 vol % of the molded article.

7. The method of claim 1, wherein the flow length is from ≥30 cm to ≤90 cm.

8. The method of claim 1, wherein the section having the thin elongated profile has a thickness of from 0.1 mm to 1.5 mm.

9. The method of claim 1, wherein the diacid is adipic acid and the diamine is hexamethylenediamine.

10. The method of claim 1, wherein the molded article has:

a tensile strength (ISO 527, dry-as-molded specimens) of at least 80 MPa, and an unnotched Charpy impact energy (ISO 179, dry-as-molded specimens) of at least 100 kJ/m$^2$.

11. The method of claim 1, wherein the polyimide resin further comprises at least one copolyamide.

12. The method of claim 1, wherein the polyamide resin has amine end groups (AEG) below 40 milliequivalents per kg (meq/kg) of the polyamide resin.

13. The method of claim 1, wherein the diacid is adipic acid and the diamine is hexamethylenediamine.

14. The method of claim 1, wherein the molded article has:

a tensile strength (ISO 527, dry-as-molded specimens) of at least 80 MPa, and an unnotched Charpy impact energy (ISO 179, dry-as-molded specimens) of at least 100 kJ/m$^2$.

15. The method of claim 1, wherein the polyamide resin further comprises at least one copolyamide.

16. A method of making a molded article, the method comprising:

molding a polymer feed comprising nylon-6,6 to form the molded article without raising the temperature of the polymer feed above 315° C., wherein the molded article comprises nylon-6,6, and a section having a thin elongated profile comprising a thickness of up to 1.5 mm, and a flow length of at least 25 cm;

wherein an absolute value of ΔRV of the molded article as compared to the polymer feed is from 0 to 4.8, the RV determined according to ASTM D789, the polymer feed comprises a polyamide resin having a moisture content of 0.03 to 0.20 wt %, the polyamide resin comprising from 90 to 99.9 wt. % polyamide condensation product of diacid and diamine, from 3 to 200 ppmw phosphorus, present as an oxyphosphorus compound, from 800 to 3000 ppmw acetic acid end groups on the polyamide, and amine end groups (AEG)<N milliequivalents per kg (meq/kg) of the polyamide resin, where N is selected from integers from 40 to 50, inclusive, the polyamide resin has a RV from 26 to 42, the RV determined according to ASTM D789, and the method is sufficient such that if the moisture content of the polymer feed is 0.14 wt %, then the absolute value of ΔRV of the molded article as compared to the polymer feed is from 0 to 4.8, the RV determined according to ASTM D789.

17. A method for making a molded article comprising:

molding a polymer feed comprising nylon-6,6 in a mold to form the molded article without raising the temperature of the polymer feed above 320° C., wherein the polymer feed comprises a polyamide resin having a moisture content of 0.03 to 0.20 wt %, the polyamide resin comprising from 90 to 99.9 wt. % polyamide condensation product of diacid and diamine, from 3 to 200 ppmw phosphorus, present as an oxyphosphorus compound, from 800 to 3000 ppmw acetic acid end groups on the polyamide, and amine end groups (AEG)<N milliequivalents per kg (meq/kg) of the polyamide resin, where N is selected from integers from 40 to 50, inclusive, and the polyamide resin has a RV from 26 to 42, the RV determined according to ASTM D789;

regulating the mold temperature via heat exchange with water at inlet temperature of water to the mold below 100° C.; and recovering a molded article from the mold, wherein an absolute value of ΔRV of the molded article as compared to the polymer feed is from 0 to 4.8, the RV determined according to ASTM D789;

wherein the molded article comprises
nylon-6,6, and
a section having a thin elongated profile comprising
a thickness of up to 1.5 mm, and
a flow length of at least 25 cm, and wherein the method is sufficient such that if the moisture content of the polymer feed is 0.14 wt % then the absolute value of ΔRV of the molded article as compared to the polymer feed is from 0 to 4.8, the RV determined according to ASTM D789.

18. The method of claim 1, wherein an absolute value of ΔRV of the molded article as compared to the polymer feed is from 0 to 4, the RV determined according to ASTM D789.

19. The method of claim 1, comprising molding the polymer feed comprising nylon-6,6 to form the molded article without raising the temperature of the polymer feed above 310° C.

* * * * *